United States Patent [19]

Witucki et al.

[11] Patent Number: 5,280,098

[45] Date of Patent: Jan. 18, 1994

[54] EPOXY-FUNCTIONAL SILICONE RESIN

[75] Inventors: Gerald L. Witucki; Harold L. Vincent, both of Midland, Mich.

[73] Assignee: Dow Corning Corporation, Midland, Mich.

[21] Appl. No.: 953,368

[22] Filed: Sep. 30, 1992

[51] Int. Cl.$^5$ ............. C08F 8/00; C08F 283/04; C08F 283/00; C08G 77/00
[52] U.S. Cl. .................... 528/17; 528/40; 528/10; 525/100; 525/446; 525/454; 525/476
[58] Field of Search ............ 528/17, 10, 27, 40; 525/477, 476, 100, 454, 446

[56] References Cited

U.S. PATENT DOCUMENTS

| | | | |
|---|---|---|---|
| 3,170,890 | 2/1965 | Boyd | 260/37 |
| 3,258,382 | 6/1966 | Vincent | 156/329 |
| 3,485,780 | 12/1969 | Sterman et al. | 549/215 |
| 4,229,228 | 10/1980 | Rotenberg et al. | 528/39 |
| 4,546,018 | 10/1985 | Ryuzo | 427/407.2 |
| 4,598,134 | 7/1986 | Hirai | 528/17 |
| 4,808,483 | 2/1989 | Nakasuji | 428/447 |

FOREIGN PATENT DOCUMENTS 54-116099  9/1979  Japan .

*Primary Examiner*—Ralph H. Dean
*Attorney, Agent, or Firm*—Alexander Weitz

[57] ABSTRACT

There is disclosed a method for forming a solid, epoxy-functional silicone resin by hydrolyzing and condensing a mixture of at least one organoalkoxysilane and a beta-(3,4-epoxycyclohexyl)-functional trialkoxysilane in the presence of an organotitanate catalyst. The silicone resins prepared according to the instant method find utility in the formulation of powder coatings, either alone or in combination with organic resins.

12 Claims, No Drawings

EPOXY-FUNCTIONAL SILICONE RESIN

FIELD OF THE INVENTION

The present invention relates to silicone resin compositions. More particularly, the invention relates to a method for forming a solid, epoxy-functional silicone resin by hydrolyzing and condensing a mixture of at least one alkoxysilane and a beta-(3,4-epoxycyclohexyl)-functional trialkoxysilane in the presence of an organotitanate catalyst. The silicone resins prepared according to the instant method find utility in the formulation of powder coatings, either alone or in combination with organic resins.

BACKGROUND OF THE INVENTION

In an environmentally conscious and highly regulated society various industries have an ever increasing incentive to reduce undesired emissions. The coatings industry has addressed this challenge to some degree by developing systems which have low volatile organic content (VOC). completely solventless coatings which posses excellent physical properties being particularly prized. One type of solventless coating method gaining favor is powder coating. In brief, this method involves the application of a fine powder thermoplastic or thermoset resin formulation to a substrate using a technique such as dipping in a fluidized bed of the powder or electrostatic spraying therewith. After the substrate is coated, it is heated to fuse the powder into an adherent film. In the case of thermoset resins, the film may also be cured on the substrate.

As in the development of other coating systems, it has been found that powder coatings incorporating silicones, such as the compositions described in U.S. Pat. No. 3,170,890 to Boyd et al., can offer unique advantages over corresponding formulations based only on organic resin. However, known solid silicone resins based on phenyl and alkyl-functional siloxane units have limitations in that they generally exhibit poor flexibility and have limited compatibility with organic resins. Such silicone resins are generally prepared by hydrolyzing and condensing chlorosilanes or alkoxysilanes, the latter in the presence of an acid catalyst. Alternatively, it has been found that silicone resins can be synthesized from certain alkoxysilanes with the aid of a titanate catalyst. For example. U.S. Pat. No. 3,258,382 to Vincent teaches a method of hydrolyzing phenyl substituted or aliphatic hydrocarbon substituted alkoxysilanes using an orthotitanate or a partial condensate thereof.

Organosilicone compositions containing organotitanates are also known in the primer art. For example, United States Pat. No. 4,546,018 to Ryuzo et al. discloses primer compositions which promote adhesion of room temperature-curable silicone rubber to solid substrates. The primers comprise (A) a silicone-modified epoxy resin containing both epoxy and alkoxy groups and (B) an organotitanium acid ester.

U.S. Pat. No. 4,598,134 to Hirai et al. teaches a primer composition for heat-curable silicone rubber comprising (1) a component selected from (A) an organosilicon compound having at least one epoxy group and at least one silicon-bonded alkenyl group or silicon bonded hydrogen group or (B) a mixture of an organosilicon compound having silicon-bonded hydroxyl and silicon-bonded alkenyl or silicon-bonded hydrogen and an epoxy-functional alkoxysilane. (II) a trialkoxysilane containing a hydrogen or unsaturated aliphatic group and (III) and organotitanate ester.

U.S. Pat. No. 4,808,483 to Nakasuji et al. discloses primer compositions which are mixtures of (A) a reaction product of an alkoxysilane with an epoxy resin, (B) an epoxy-functional alkoxysilane and (C) a titanate. These primers are said to improve adhesion of room-temperature curable silicone rubber to various substrates.

SUMMARY OF THE INVENTION

None of the above cited art, nor any other art of which applicants are aware, suggests the preparation of silicone resins from a combination of beta-(3,4-epoxycyclohexyl)ethyltrialkoxysilanes and certain alkoxysilanes using an organotitanate catalyst to facilitate the hydrolysis and condensation of the silanes. Applicants have discovered that when critical proportions of the above mentioned silanes are hydrolyzed and condensed and stripped of volatile components according to the method of the present invention, a solid silicone resin is obtained. The solid silicone resins of the invention are suitable for use in powder coating applications, either alone or in combination with various organic resins. They are believed to have improved compatibility with organic resins and to provide more flexible coatings than those based on the above mentioned conventional silicone resins.

The present invention therefore relates to a method for forming a solid silicone resin comprising:

(I) hydrolyzing and condensing a silane mixture in the presence of an effective amount of an organotitanate catalyst, said silane mixture consisting essentially of (A) 50 to 99 mole percent of an organosilane selected from the group consisting of an organosilane having the formula $$R'Si(OR)_3 \qquad (i),$$

an organosilane having the formula $$R'R''Si(OR)_2 \qquad (ii)$$

and mixtures of (i) and (ii), wherein R' and R'' are each selected from the group consisting of alkyl radicals having 1 to 4 carbon atoms and a phenyl radical and R is an alkyl radical having 1 to 3 carbon atoms, and (B) 1 to 50 mole percent of an epoxy-functional silane having the formula

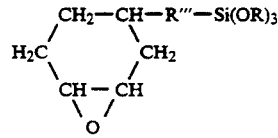

wherein R''' is a divalent hydrocarbon group having 2 to 4 carbon atoms and R is an alkyl radical having 1 to 3 carbon atoms, said silane mixture containing less than 50 mole percent of an organosilane having the formula $$MeSi(OR)_3$$

which Me denotes a methyl radical and R has its previous definition, and the molar content of said organosilane (ii) in said silane mixture being ≦70% of the molar content of said epoxy-functional silane (B) when at least one of the organic groups on said organosilane (ii) is an alkyl radical; and (II) removing any volatile components, whereby a solid silicone resin is obtained.

The present invention further relates to the compositions obtained by the above method as well as these resins in combination with various organic resins.

DETAILED DESCRIPTION OF THE INVENTION

Component (A) of the silane mixture to be hydrolyzed and condensed according the method of the present invention, described infra, is at least one organosilane selected from the group consisting of an organosilane having the formula $$R'Si(OR)_3 \qquad (i),$$

an organosilane having the formula $$R'R''Si(OR)_2 \qquad (ii)$$

and mixtures of (i) and (ii), wherein R' and R" are independently selected from the group consisting of alkyl radicals having 1 to 4 carbon atoms and a phenyl radical and R is an independently selected alkyl radical having 1 to 3 carbon atoms. Preferably, R is a methyl radical and R' and R" are independently selected from phenyl and methyl radicals.

Specific examples of silane (i) include phenyltrimethoxysilane, methyltrimethoxysilane, ethyltrimethoxysilane, phenyltriethoxysilane, n-propyltrimethoxysilane, isopropyltrimethoxysilane, n-butyltrimethoxysilane and isobutyltrimethoxysilane. Specific examples of silane (ii) include dimethyldimethoxysilane, phenylmethyldimethoxysilane, ethylmethyldimethoxysilane, phenylpropyldiethoxysilane and phenylethyldimethoxysilane.

Component (B) of the silane mixture used in the instant method is an epoxy-functional silane having the formula

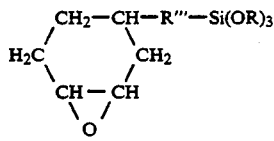

wherein R''' is a divalent hydrocarbon group having 2 to 4 carbon atoms and R is an alkyl radical having 1 to 3 carbon atoms. It is preferred that R is a methyl radical and R''' is an alkylene group. A highly preferred component (B) is beta (3,4-epoxycyclohexyl)ethyltrimethoxysilane.

For the purposes of the present invention, the mixture of silanes (A) and (B) should contain less than about 50 mole percent of an organosilane having the formula MeSi(OR)$_3$, in which Me hereinafter denotes a methyl radical and R has its previous definition. Furthermore, the molar content of organosilane (ii) in the silane mixture should be ≦70% of the molar content of the epoxy-functional silane (B) when at least one of the organic groups on said organosilane (ii) is an alkyl radical. It has been found that when the above two conditions are not met, either the silanes tend to form a gel during the hydrolysis/condensation step, described infra, or the resultant resins are not solids at room temperature and are therefore unsuitable for powder coating applications.

The organotitanate catalyst which is used to facilitate the hydrolysis and condensation of silanes (A) and (B) may be a chelated organotitanate, such as titanium isopropoxybis(acetylacetonate) and bis(ethyl-3-oxobutanolato-O$^1$, O$^3$)bis(2-propanolato)-titanium. Several such chelates are available commercially (e.g., the TYZOR TM series of organic titanates from Du Pont). Preferably, the organo-titanate catalyst has the general formula $$Ti(OR'''')_4$$

wherein R'''' is an independently selected alkyl radical having 1 to 8 carbon atoms. Specific examples of suitable organotitanates include tetrabutyl titanate, tetraisopropyl titanate, tetramethyl titanate, ethylmethyldibutyl titanate, tetraoctyl titanate and tetraethylhexyl titanate. For the purposes of the present invention, it is preferred that component (II) is tetra(n butyl) titanate.

All of the components used in the instant method are well known in the art and further description thereof is considered unnecessary.

In a preferred embodiment, the method of the present invention is carried out by first forming a homogeneous mixture of silanes (A) and (B) and the organotitanate catalyst. In this mixture, the mole ratio (mole percent) of organosilane (A) to epoxy-functional silane (B) is about 50:50 to about 99:1. Preferably, this ratio is about 10:1 to 50:1. When this ratio is greater than about 99:1. the flexibility imparted by epoxy-functional silane (B) is not obtained. On the other hand, when this ratio is less than about 50:50. the silanes tend to gel when hydrolyzed and condensed according to the instant method.

The above mixture is then heated, preferably to about 50° C. to 60° C. and water is added thereto, preferably in a slow, controlled fashion (e.g., dropwise). At least about 0.5 mole of water is used for each mole of total alkoxy groups (i.e., —OR) present in silanes (A) and (B). This water level is the minimum necessary to achieve a substantially complete hydrolysis of the silanes. When considerably more than about 0.5 moles of water are used for each mole of —OR present in the silanes, the process efficiency suffers since the excess water must be removed in a subsequent operation.

After all the water has been added, the reactants are heated to reflux, preferably for about 0.5 to 2 hours. The byproduct alcohol (ROH) resulting from the hydrolysis of the silanes, and any residual water (i.e., essentially all of the volatile components in the system), are then removed by a conventional method, such as distillation, thin-film stripper, roto-evaporator, vacuum oven, inter alia, to provide a solid silicone resin according to the present invention. While not wishing to be held to any particular theory or mechanism, it is believed that most of the alkoxy groups of the silanes are hydrolyzed by the water and the resultant hydroxyl groups on silicon then co-condense, both reactions being facilitated by the organotitanate catalyst, to form the polymeric resin of the invention according to the following generalized equations:

$$\equiv SiOR + H_2O \rightarrow \equiv SiOH + ROH$$

In this regard, the effective amount of the above described organotitanate catalyst to be used should be that which is sufficient to facilitate the hydrolysis of the alkoxy groups of the silanes and to promote the condensation of the resulting hydrolyzate intermediate to form a solid resin upon removal of essentially all volatile components. As used herein, the term "solid" refers to a material having a softening point (i.e., glass transition temperature or melting point) above room temperature (i.e., about 25° C.). It is has, however, been determined that when the organotitanate catalyst is present at less than about 0.01 percent based on the molar content of organosilane (A) plus epoxy-functional silane (B). there is some tendency toward premature gelation of the silane/organotitanate mixture. Likewise, when the mixture contains more than about 5.0 mole percent of the organotitanate based on the total of silanes (A) and (B). this combination is prone to gelation during the hydrolysis/condensation step. Therefore, the aforementioned molar percentages generally represent the lower and upper limits of practical catalyst addition, respectively. More preferably, the organotitanate is used at a level of about 0.05 to 0.5 percent based on the total moles of silanes (A) plus (B).

In an alternate procedure, an inert organic solvent may be added to the reaction mixture, either in combination with the silane mixture or after the above mentioned reflux step. By "inert" it is meant that the solvent does not react with any of the components used in the instant method. Thus, up to about 50 percent of an organic solvent, such as toluene, xylene, methylethyl ketone, glycol ether PM acetate and methyl isobutyl ketone, may be used based on the total weight of silanes (A) and (B). When a solvent such as toluene is used, removal of residual water is facilitated since an azeotrope is formed therewith. The organic solvent is, of course, removed in a final stripping operation, as described above, to provide the solid silicone resin.

The solid silicone resin of the present invention may be used as a binder in various conventional paint and coating applications and such formulations may be delivered in suitable solvent or water emulsion form according to methods known in the art.

Due to its solid character the silicone resin produced according to the instant method is particularly suitable for the preparation of powder coating compositions. Moreover, since the silicone resin of the invention is compatible with various organic resins, such resins as polyurethanes, cycloaliphatic epoxies, acrylics, polyesters and, to a limited extent, glycidyl epoxies may be blended therewith. These resin blends may be combined with various fillers, extenders, pigments, flow agents, cure agents and catalysts to provide compositions suitable for powder coating applications. These formulations may be applied to substrates by conventional powder coating methods, the interested reader being referred to, for example, the text entitled "Powder Coatings—Chemistry and Technology" by T. A. Misev, published by J. Wiley & Sons (1991) for detailed descriptions of the related techniques.

EXAMPLES

The following examples are presented to further illustrate the method and compositions of this invention, but are not to be construed as limiting the invention, which is delineated in the appended claims. All measurements were obtained at about 25° C. unless indicated to the contrary.

EXAMPLE 1 (a)

Into a three-necked flask equipped with a condenser, addition funnel, thermometer, stirrer and nitrogen gas pressurization tube, there was charged a mixture of 30 mole percent (30.3 grams) of beta-(3,4-epoxycyclohexyl)ethyltrimethoxysilane (ETMS), 70 mole percent (56.8 grams) of phenyltrimethoxysilane (PTMS) and 0.57 weight percent (0.5 gram) of tetra(n-butyl) titanate (TBT) catalyst based on the total weight of the two silanes. This represented a TBT content of 0.36 percent based on the molar content of the silanes used. After heating the above ingredients to 50° C. under a nitrogen blanket, water was added in a dropwise manner from the addition funnel; i.e., for each mole of methoxy radicals associated with the two silanes, there was added 0.575 mole of water. When the water was added the reaction mixture exothermed to a temperature of 74° C. resulting in a clear solution. The contents were refluxed for one hour and subsequently cooled to 24° C.

A 190 gram portion of the above solution (i.e., in the byproduct methanol) was dried in a vacuum oven (50° C./10 mm Hg/30 min.) and resulted in a clear, brittle, dry resin, soluble in both toluene and acetone. This solid resin exhibited a softening point (Fisher-Johns melt point apparatus) of approximately 45° C.

EXAMPLE 1 (b)

One hundred grams of toluene and 0.7 gram of zinc octoate were added to the solution formed in Example 1 (a) and a heat bodying/water azeotrope step was carried out for 90 minutes at temperatures up to 83° C., as methanol byproduct was removed. The viscosity of the solution rose by a factor of about 2.5 during this step. A sample of this solution was dried and the resulting resin, which had a softening point of approximately 65° C., was soluble in acetone but not in toluene.

EXAMPLE 1 (c)

The toluene solution of Example 1 (b) was bodied further until the azeotroping of water ceased. After drying this solution, the resulting resin had a softening point greater than 65° C. and was insoluble in both acetone and toluene.

EXAMPLE 2

The procedure of Example 1(a) was followed wherein the amount of water used in the hydrolysis was increased to 0.625 mole for each mole of methoxy radicals associated with the two silanes. After the refluxing step, the flask contents were stripped at atmospheric pressure to about 90° C. and then further stripped to about 110° C. at about 10 mm Hg. At this point, 50 grams of toluene (10% based on the total weight of resin formed) was introduced and the contents of the flask were heated to azeotrope off residual water. The contents were then poured into an aluminum tray and again dried in a vacuum oven for 30 minutes at 50° C./5 mm Hg. The resulting dried resin was soluble in acetone but not toluene and exhibited a softening point of approximately 65° C.

EXAMPLE 3

The procedure of Example 2 was followed wherein the silane ingredients were ETMS. PTMS and phenylmethyldimethoxysilane (PMDMS) in a molar ratio of 30:50:20, respectively. The catalyst, TBT, was again fixed at 0.5% based on the total weight of the three silanes. This represented a TBT content of 0.36 percent based on the molar content of the silanes used. After drying, a white powder having a softening point of approximately 65° C. and being soluble in acetone, but not toluene, was obtained.

An aluminum panel was flow-coated with a 30% solution of the above obtained resin solid in methylethyl ketone (MEK) and cured (30 min./204° C.). The resulting film was clear and was subjected to the following physical testing:

Pencil Hardness—Refers to the hardest pencil which does not cut through the cured film surface, per American Society for Testing Materials ASTM D3363.

Mandrel Bend Test (Flexibility) ASTM D1737 S A film is coated onto a metal panel and the composite is bent (180 degrees) around a mandrel of a given radius. The smallest radius mandrel which does not result in cracks or other failure of the film is taken as an indication of the film's flexibility.

T-Bend Test (Flexibility) ASTM D4145 S A film is coated onto a metal panel and the composite is bent on itself at an angle of 180 degrees to form a "OT" bend. If cracking is observed, the panel is again folded on itself, as necessary, until no cracking occurs.

Solvent Resistance S In this method, the rounded end of a one-pound ballpeen hammer is wrapped with eight layers of cotton gauze and the gauze soaked in the specified solvent, such as methylethyl ketone (MEK). The weighted gauze is then dragged, back and forth (i.e., double rubs) across the coating surface 200 times or until failure results (indicated by visible scarring of the coating or penetration thereof). Results according to the above tests were:
Pencil Hardness=H
T-Bend Flexibility=OT bend
Solvent resistance$\leqq$200 double-rubs MEK

EXAMPLE 4

The procedure of Example 3 was repeated wherein the silanes ETMS. PTMS and PMDMS were employed at a molar ratio of 30:45:20. respectively and the TBT catalyst content was 5% based on the total moles of the three silanes. Some precipitation was noted during the hydrolysis, however this material went into solution during the reflux step leaving a slight haze in the reaction mixture. This product was cooled and filtered to yield a clear, deep yellow solution.

An aluminum panel was coated with the above solution and cured at 204° C./30 minutes. The resultant film was hard and brittle.

EXAMPLE 5

The procedure of Example 2 was repeated wherein the silanes ETMS and PTMS were employed at a molar ratio of 10:90, respectively. The TBT catalyst content was 0.2% based on the total weight of the three silanes (i.e., a TBT content of 0.14 percent based on the molar content of the silanes).

After vacuum oven drying, the resulting white resin powder was soluble in xylene. Aluminum panels were flow-coated with a 20% weight solution of this resin in xylene and cured (30 min./204° C.). The cured films were hard and glossy, but could be marred with a fingernail; the film crazed when the panel was bent.

EXAMPLE 6

The procedure of Example 3 was repeated wherein the silanes ETMS, PTMS and PMDMS were employed at a molar ratio of 15:75:10. respectively and the TBT catalyst content was 0.2% based on the total weight of the three silanes. This represented a TBT content of 0.14 percent based on the molar content of the silanes used.

When the above solution was stripped, a dry powder was obtained which was slightly soluble in xylene and readily soluble in MEK. A cured film on aluminum was clear, tough and flexible. Pencil Hardness was >H: T-Bend was OT.

EXAMPLE 7

The procedure according to Example 6 was repeated wherein the azeotroping and vacuum stripping steps were eliminated (i.e., no toluene was added). The product was a clear, viscous liquid after the atmospheric stripping and cooling. The flask was re-heated to 80° C. and the resin was poured into an aluminum tray and stripped in a vacuum oven to a temperature of 120° C. at 5 mm Hg for 30 minutes. The final resin was a dry powder, partially soluble in xylene, readily soluble in methylisobutyl ketone (MIBK). Titration for epoxy equivalent weight showed that only 20% of the original epoxy functionality remained.

A 33 weight % solution of the resin of Example 7 in a 50/50 (weight %) MIBK/xylene blend was prepared. Steel panels were flow-coated with this solution, air-dried and cured (30 min/204° C.). The following film properties were observed:
Hardness=3H
T-Bend Flexibility=OT Bend
Solvent Resistance=100+double rubs MEK

EXAMPLE 8

The procedure of Example 7 was used to prepare a solid resin according to the instant invention wherein the silane mixture consisted of ETMS. PTMS. PMDMS, diphenyldimethoxysilane (DPDMS) and methyltrimethoxysilane (MTMS) in a molar ratio of 5:50:2:8:35. respectively. This silane mixture was hydrolyzed using 0.625 mole of water for the total moles of methoxy present in the five silanes and employing a TBT catalyst content of 0.2 weight percent (i.e., a molar TBT content of 0.14%). The dried product was a solid resin. This resin was coated on a panel and cured as described above: the resulting film exhibited excellent physical characteristics: 2H Pencil Hardness; T-Bend=1T; Solvent Resistance=200+ double rubs MEK.

(COMPARATIVE) EXAMPLE 9

The procedure of Example 1 (a) was followed with the exception that the TBT catalyst was replaced with concentrated hydrochloric acid at a level of 0.12% based on the total weight of the silanes used. During the atmospheric strip step the resin gelled. This experiment indicated that the HCl is not a suitable catalyst for the hydrolysis and condensation of a beta-(3,4-epoxycyclohexyl)-functional alkoxysilane.

(COMPARATIVE) EXAMPLE 10

The procedure according to Example 3 was repeated wherein the ETMS was replaced with gamma-glycidoxypropyltrimethoxysilane (GPTMS). That is, the silane mixture consisted of PTMS, PMDMS and GPTMS in a molar ratio of 50:20:30, respectively. During vacuum stripping, the temperature reached 120° C. and the resin product gelled.

The above experiment was repeated but the strip temperature was held at about 110° C. range. The resulting material was a viscous liquid which gelled upon storage for three weeks.

(COMPARATIVE) EXAMPLE 11

The procedure of Example 2 was used to hydrolyze and condense PTMS and GPTMS in a molar ratio of 70:30, respectively using 0.625 moles of water for each mole of total methoxy present in the two silanes. TBT catalyst was used at a level of 0.3% based on the weight of the silanes (i.e., 0.21 mole %). The resulting resin was a viscous liquid.

The results obtained in (Comparative) Examples 10 and 11 illustrate the general non-equivalence of silanes having beta-(3,4-epoxycyclohexyl) functionality and those having gamma-glycidoxy functionality for the purpose of producing a solid silicone resin according to the instant method.

(COMPARATIVE) EXAMPLE 12

The procedure of (Comparative) Example 11 was followed wherein the silane mixture consisted of ETMS and MTMS in a molar ratio of 30:70, respectively and the TBT catalyst was again 0.3% based on the weight of the silanes. This reaction mix gelled during the reflux step.

(COMPARATIVE) EXAMPLE 13

The procedure of (Comparative) Example 12 was followed wherein the silane mixture consisted of ETMS. PMDMS and MTMS in the molar ratio of 30:20:50. The flask contents gelled during atmospheric stripping.

(Comparative) Examples 12 and 13 illustrate the need to maintain the level of trimethylalkoxysilane below 50 mole percent of the silane mixture.

(COMPARATIVE) EXAMPLE 14

The procedure according to (Comparative) Example 13 was repeated wherein the silane mixture consisted of ETMS and PMDMS in a molar ratio of 30:70, respectively. This reaction resulted in a viscous liquid which remained fluid for seven months.

(COMPARATIVE) EXAMPLE 15

The procedure according to (Comparative) Example 14 was repeated wherein the silane mixture consisted of ETMS. PTMS. and PMDMS in a molar ratio of 10:60:30. respectively and the TBT catalyst was 0.05% based on the weight of the three silanes (i.e., 0.035% based on the total moles of silanes present). After reaction, the resulting resin was placed in a vacuum oven overnight (50° C./10 mm Hg): it was observed to be a non-tacky, near solid material having a softening point below room temperature which was soluble in xylene.

(Comparative) Examples 14 and 15 illustrate the requirement to maintain the diorganosilane content at less than or equal to about 70 percent based on the molar content of the beta-(3,4-epoxycyclohexyl)-functional component.

(COMPARATIVE) EXAMPLE 16

The procedure according to Example 3 was repeated wherein the reaction mixture consisted of ETMS. PTMS. PMDMS and TBT catalyst in a molar ratio of 20:40:20:20, respectively. The initial solution was dark yellow and solids formed when water was added. The temperature reached 56° C. upon completion of water addition; then two minutes later, exotherm and reflux occurred. After seventy-five minutes the solids failed to dissolve and the reaction was terminated.

EXAMPLE 17

The solid resin obtained in Example 7 was formulated into a white powder coating composition (parts by weight):

70 parts by weight resin
30 parts by weight titanium dioxide pigment (R-960)
1.0 part by weight Resiflow ™ P67
0.4 part by weight Benzoin wherein Ti-Pure ™ R-960 is a $TiO_2$ filler having a particle size of 0.35 micron marketed by Du Pont, Wilmington, Del. Resinflow ™ is described as a flow additive and is produced by Worlee Chemie, Germany: and Benzoin is benzoyl phenyl carbinol obtained from Rhone-Poulenc, France. The resin, pigment and other ingredients detailed above were mixed on a two-roll mill at 70° C. and cooled to room temperature. The resulting mixture was further cooled by pouring liquid nitrogen thereover and it was then ground to a fine powder using a Waring ™ blender. The resulting powder was sifted through a sieve to produce a white powder composition having a particle size of about 10 microns or less.

For comparative purposes, a conventional solid, hydroxyl functional organosiloxane resin copolymer consisting essentially of $MeSiO_{3/2}$ units, $PhMeSiO_{2/2}$ units, $PhSiO_{3/2}$ units and $Ph_2SiO_{2/2}$ units, in a molar ratio of 45:5:40:10, in which Ph hereinafter denotes a phenyl radical, and having a hydroxyl content of about 5% by weight, was also formulated into a similar white powder coating composition.

The above two white powder coating compositions were applied to aluminized steel, aluminum, and stainless steel panels using a conventional electrostatic powder coating technique. After application, the powder coatings were cured for 15 minutes at 204° C. The panels were then tested for hardness, flexibility and solvent resistance, the results being presented in Table 1.

TABLE 1

| | COMPARATIVE SILICONE RESIN | RESIN OF EXAMPLE 7 |
|---|---|---|
| PENCIL HARDNESS | | |
| ALUM. STEEL | <5B | B |
| ALUMINUM | B | H |
| STAINLESS STEEL | 2B | 3H |
| ZSOLVENT RESISTANCE | | |
| MEK DOUBLE RUBS | 9 | >200 |
| FLEXIBILITY | | |
| MANDREL FLEXIBILITY (mm) | 25 | 6 |

EXAMPLE 18

The practical lower limit of organotitanate catalyst addition was investigated in a system wherein the silane mixture consisted of ETMS. PTMS and PMDMS in a molar ratio of about 30:49:21. respectively. Various amounts of TBT catalyst were added to individual vials of the silane mixture and these were hydrolyzed using 0.625 mole of water for each mole of methoxy group present in the silane combination. The amounts of TBT ranged from zero (control formulation) to about 0.5% based on the moles of silanes present. The vials were shaken vigorously, placed in an oven at 50° C. and observed at regular intervals.

It was found that samples containing at least 0.01 mole percent of the TBT were stable for over six weeks, whereas samples containing 0.005 mole percent or less formed a gelatinous lower phase after about one week.

EXAMPLE 19

The experiment of Example 18 was repeated using a different organotitanate catalyst. TYZOR ™ DC. This material, supplied by Du Pont (Wilmington. Del.) is described as the chelate bis(ethyl-3-oxobutanolato-$O^1,O^3$)bis(2-propanolato)-titanium.

In this series, samples containing at least 0.005 mole percent of the TYZOR ™ DC were stable for over six weeks whereas a sample containing 0.001 mole percent of this catalyst formed a gelatinous lower phase after about one week.

It was therefore concluded that, in general, at least about 0.01 mole percent (based on the total moles of silanes) of the organotitanate catalyst should be included for the purposes of the instant method.

EXAMPLE 20

The general procedure of Example 7 was followed wherein 48.0 grams of ETMS and 38.6 grams of PTMS were hydrolyzed/condensed using 13.2 grams of water and 0.2 grams of TBT catalyst. This represented a molar ratio of ETMS:PTMS of 50:50, a TBT content of 0.15% based on the moles of silanes used and a water content of 0.625 mole for each mole of methoxy groups present in the two silanes. After the reflux step, the flask contents were stripped at 110° C./10 mm Hg to give a viscous liquid at this temperature. A sample was withdrawn and cooled to produce a dry, brittle powder.

Vacuum was again applied and the flask contents were heated. At a temperature of 115° C. the resin gelled.

(COMPARATIVE) EXAMPLE 21

The procedures of Example 20 were followed wherein only ETMS was employed. Here, 87.8 grams of ETMS was hydrolyzed/condensed using 12 grams of water and 0.2 grams of TBT catalyst. This represented a TBT content of 0.16% based on the moles of silane used and a water content of 0.625 mole for each mole of methoxy groups present in the silane. The exotherm resulting from this reaction was stronger than that observed when a mixture of silane was used and the viscosity of the flask contents increased visibly during the reaction. The resulting resin gelled within five minutes of water addition.

That which is claimed is:

1. A solid silicone resin prepared by
   (I) hydrolyzing and condensing a silane mixture in the presence of an effective amount of an organotitanate catalyst, said silane mixture consisting essentially of
   (A) 50 to 99 mole percent of an organosilane selected from the group consisting of an organosilane having the formula 'Si(OR)$_3$  (i), an organosilane having the formula R'R"Si(OR)$_2$  (ii)

and mixtures of (i) and (ii), wherein R' and R" is each an organic group selected from the group consisting of alkyl radicals having 1 to 4 carbon atoms and a phenyl radical and R is an alkyl radical having 1 to 3 carbon atoms, and
   (B) 1 to 50 percent of an epoxy-functional silane having the formula

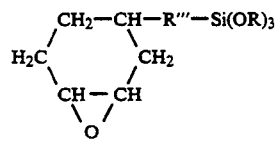

wherein R''' is a divalent hydrocarbon group having 2 to 4 carbon atoms and R is an alkyl radical having 1 to 3 carbon atoms, with the proviso that, said silane mixture contains less than 50 mole percent of an organosilane component having the formula MeSi(OR)$_3$ in which Me denotes a methyl radical and R has its previous definition, and with the further proviso that the molar content of said organosilane (ii) in said silane mixture is ≦70% of the molar content of said epoxy-functional silane (B) when at least one of said organic groups R' or R" on said organosilane (ii) is an alkyl radical; and
   (II) removing any volatile components, whereby a solid silicone resin is obtained.

2. The silicone resin according to claim 1 wherein R''' of said epoxy-functional silane (B) is an ethylene group.

3. The silicone resin according to claim 2, wherein R of organosilane (A) and epoxy-functional silane (B) is a methyl radical.

4. The silicone resin according to claim 3, wherein R' and R" of said organosilane (A) are each selected from the group consisting of phenyl and methyl radicals.

5. The silicone resin according to claim 4, wherein the molar ratio of said organosilane (A) to said epoxy-functional silane (B) is 10:1 to 50:1.

6. The silicone resin according to claim 5, wherein said organotitanate catalyst is tetra(n-butyl) titanate.

7. In a powder coating composition comprising an organic resin and a silicone resin, the improvement comprising the use of the resin of claim 1 as said silicone resin.

8. In a powder coating composition comprising an organic resin and a silicone resin, the improvement comprising the use of the resin of claim 2 as said silicone resin.

9. In a powder coating composition comprising an organic resin and a silicone resin, the improvement comprising the of the resin of claim 3 as said silicone resin.

10. In a powder coating composition comprising an organic resin and a silicone resin, the improvement comprising the use of the resin of claim 4 as said silicone resin.

11. In a powder coating composition comprising an organic resin and a silicone resin, the improvement comprising the use of the resin of claim 5 as said silicone resin.

12. In a powder coating composition comprising an organic resin and a silicone resin, the improvement comprising the use of the resin of claim 6 as said silicone resin.

* * * * *